United States Patent [19]
Decker et al.

[11] 4,161,117
[45] Jul. 17, 1979

[54] HYDRAULIC-ELECTRONIC LOAD SENSING DEVICE FOR LOAD INDICATING APPARATUS

[75] Inventors: Elmer L. Decker, Long Beach; James Moon, Santa Ana, both of Calif.

[73] Assignee: Decker Engineering Corporation, Long Beach, Calif.

[21] Appl. No.: 857,583

[22] Filed: Dec. 5, 1977

[51] Int. Cl.² .............................................. G01L 1/26
[52] U.S. Cl. ..................................... 73/141 R; 73/143
[58] Field of Search .............................. 73/141 R, 143

[56] References Cited
U.S. PATENT DOCUMENTS

| | | | |
|---|---|---|---|
| 3,004,558 | 10/1961 | Crane | 73/143 X |
| 3,999,427 | 12/1976 | Decker et al. | 73/143 X |

*Primary Examiner*—Charles A. Ruehl
*Attorney, Agent, or Firm*—Paul A. Weilein

[57] ABSTRACT

A load sensing device for connection in load indicating apparatus between a pair of spaced members arranged to move apart under applied load tension forces, the load sensing device having a hydraulic load cell and an electronic load cell mechanically mounted in stacked series relationship and being respectively connected with a load indicator, wherein the applied tension load forces of the apparatus are mechanically converted into compression load forces for the actuation of the load cells. Manual selectors are also provided to permit the selective use of one or the other of the load cells as the sensing medium to energize its associated load indicator, and which includes a split ring for selectively bypassing the load forces with respect to the hydraulic load cell when utilizing the electronic load cell.

9 Claims, 7 Drawing Figures

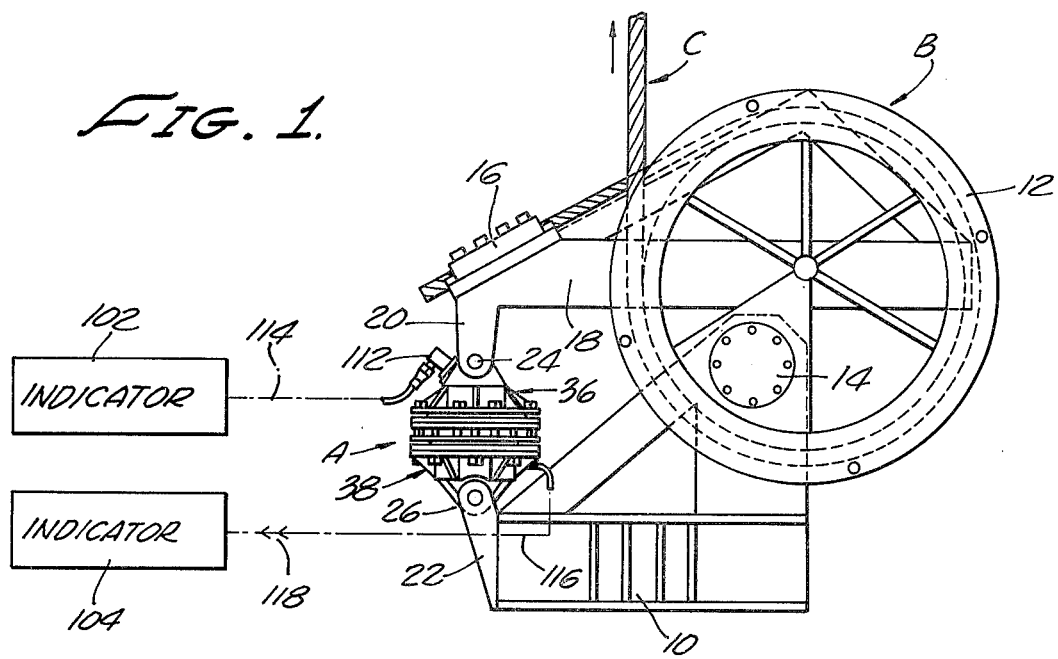

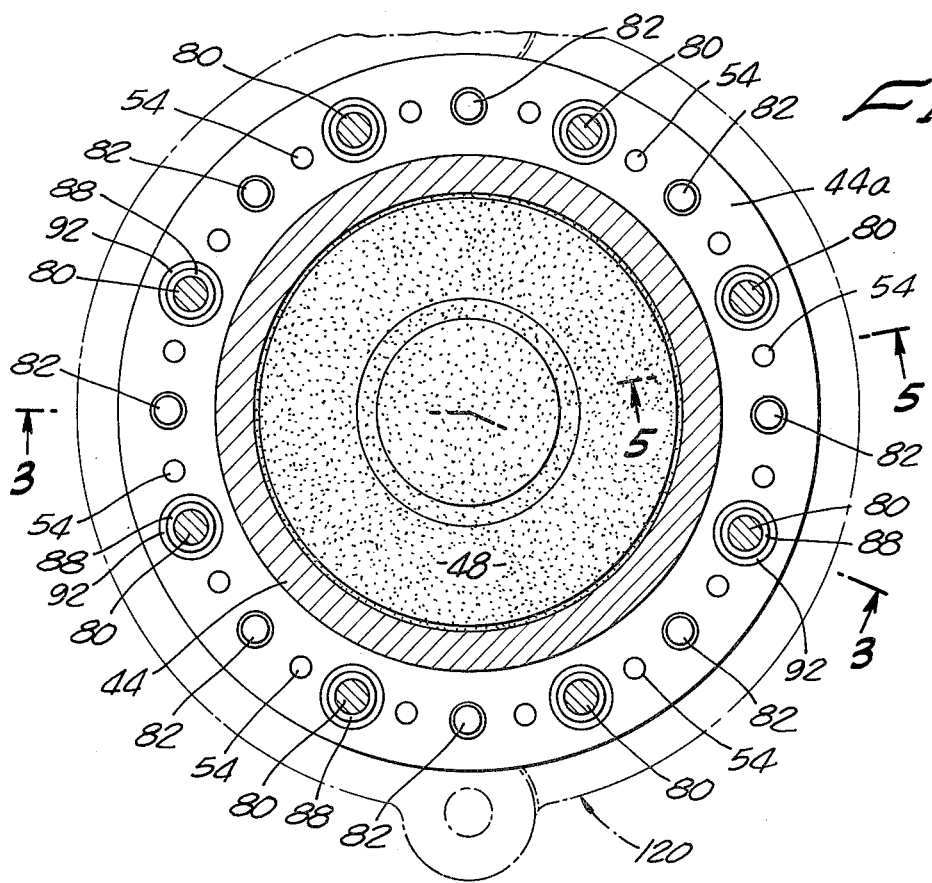
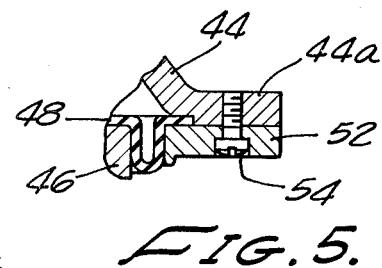
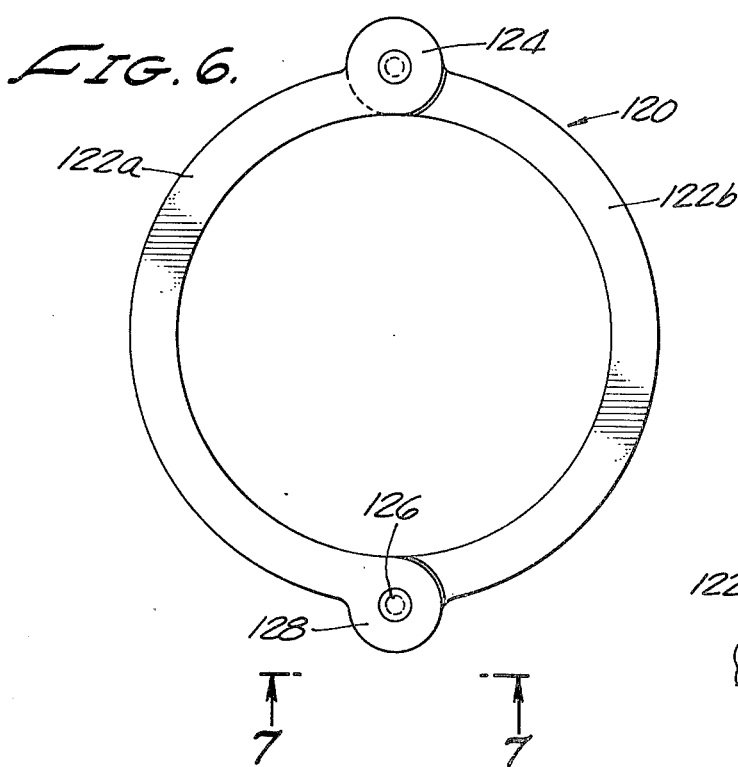
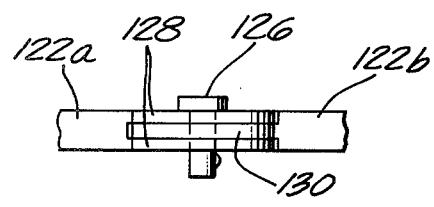

HYDRAULIC-ELECTRONIC LOAD SENSING DEVICE FOR LOAD INDICATING APPARATUS

BACKGROUND OF THE INVENTION

The present invention relates generally to sensing devices for use in connection with apparatus for indicating the load sustained by the lines, cable and the like in cranes, derricks, and similar equipment.

Heretofore, apparatus for indicating load forces has, in the main, been so designed as to provide a pair of load reaction arms arranged to move either towards each other or away from each other under the application of the load forces. For a number of years, it has been common practice to utilize sensing devices of the hydraulic load cell type which could be readily mounted between the load reaction arms of the apparatus. The hydraulic load cell device was in one case arranged mechanically to subject the load cell to compression forces when connected between the load reactive arms of the apparatus which were movable away from each other under the load forces, and in the other case was designed to subject the hydraulic load cell to compression forces when the load reaction arms were moved towards each other. Also, in a similar manner load sensing devices utilizing electronic or electric load cells have been known heretofore.

More recently, as disclosed in U.S. Pat. No. 3,999,427 dated Dec. 28, 1976, it has been known to utilize a hydraulic-electronic load sensing unit having a pair of operatively associated load cells, one of the cells being of the hydraulic type and the other of the electronic type. The unit of this patent, however, is limited in use to load indicating apparatus in which the load reaction arms are movable towards each other under the applied load forces.

It is the purpose of the present invention to provide a hydraulic-electronic load sensing device which is susceptible of use for load sensing apparatus in which the load reaction arms move away from each other under the applied load forces.

In the load sensing unit of the above mentioned patent, selective use of the load cells is accomplished by selectively by-passing the load forces acting on one or the other of the load cells by means of a mechanical expedient in order to use one or the other of the load cells as the active load sensing medium of the unit. In the present invention, the by-passing means for the load forces applied to the hydraulic load cell has been greatly simplified, and the load by-passing mechanical means for the electronic load cell has been eliminated and replaced by a simplified arrangement which permits electrical disconnection of the indicator from the electronic cell, without the necessity of having to alter its responsive action to the load forces.

SUMMARY OF THE INVENTION

The present invention is more specifically concerned with a combined hydraulic-electronic load sensing device in which applied load forces tending to move the load reaction arms of the indicating apparatus or means apart will be converted into compression forces for the actuation of the hydraulic load cell as well as the electronic load cell.

With the foregoing in mind, it is one object of the present invention to provide a load sensing device to which load tension forces may be applied directly, and which utilizes both hydraulic and electronic load sensing cells that are activated by compression forces.

It is a further object to provide a load sensing device according to the foregoing object, which embodies a unique mechanical interconnection of the load cells such as will enable use of the device in a variety of force or load measuring and indicating apparatus of the type in which a pair of members are moved apart by load tension forces rather than towards each other.

Another object is to provide a unique load sensing device containing both a hydraulic load sensing cell connected to an indicator, and an electronic load sensing cell connected to an indicator, and in which the forces applied to the hydraulic cell may be by-passed when using the electronic load cell, and the indicator of the electronic load cell may be electrically disconnected when using the hydraulic load cell.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 1 is a side elevational view of a combined cable anchor and weight indicating apparatus which includes a load sensing device embodying the present invention;

FIG. 2 is a side elevational view of another application of a load sensing device embodying the present invention;

FIG. 3 is an enlarged vertical sectional view of the device of FIG. 1, taken substantially on line 3—3 of FIG. 4;

FIG. 4 is a fragmentary sectional view taken substantially on line 4—4 of FIG. 3;

FIG. 5 is a fragmentary sectional view taken substantially on line 5—5 of FIG. 4;

FIG. 6 is a plan view of a split ring member as used for by-passing the load forces applied to the hydraulic load cell; and FIG. 7 is a fragmentary elevational end view, as seen on line 7—7 of FIG. 6, and showing the means for releasably securing adjacent ring ends together.

DESCRIPTION OF A PREFERRED EMBODIMENT

Referring more specifically to the drawings, a load sensing device A embodying the present invention is shown in FIG. 1 as forming a part of a combined cable anchor and weight indicating apparatus B, such as employed in connection with well drilling apparatus. The apparatus in this case includes a base 10 on which a snubbing drum 12 is eccentrically mounted on an off-center pivot 14 for translatory and rotative movement. A cable C, which may be the deadline of a hoist system for a rotary well drilling rig, or other line upon which a pulling force is applied, is trained around the drum and carried to a dead end cable clamp 16 by which it is releasably secured to the outermost end of a radially extending lever arm 18 which is rigidly affixed to the drum 12. The base 10 and lever arm 18 are respectively provided with connector lugs 20 and 22 which are in vertically aligned spaced relation and as thus arranged provide a pair of supporting members which are adapted to move away from each other under applied tension load forces on the cable C, and between which the load sensing device A of the present invention may be appropriately supported on connecting pivots 24 and 26.

As shown in FIG. 2, the load sensing device A is illustrated as being embodied in another application, wherein the load sensing device A is connected between a clevis member 28 and hook member 30 to facilitate connection thereof between the looped ends of cables 32 and 34 such as may comprise a running line or a line which is tied down by a cable, and so that the load sensing device A will be subjected to applied tension forces.

More specifically, as best shown in FIG. 3, the load sensing device A includes a combined electronic or electric load cell E and a hydraulic load cell H which are mounted in axially aligned stacked relationship for series reaction to applied tension load forces which may result from the relative movement of the connector lugs 20 and 22 of FIG. 1 away from each other, or applied tension forces resulting from the relative movement of the clevis member 28 and hook member 30 in FIG. 2 away from each other.

In the present invention, the electronic load cell E and hydraulic load cell H are of conventional construction and operate under applied compression forces. It will therefore be apparent that means must be provided for mechanically converting the tension load forces in the cable C or between the cables 32 and 34 into compression forces for the operation of the associated load cells. Thus, in the illustrated applications, the cells are operatively mounted between a pair of force applying elements 36 and 38 of which the element 36 is the upper one of the elements, while the other element 38 is the lower of the elements. In order to withstand the relatively large load forces imposed upon them, the elements 36 and 38 are of generally conical configuration, being formed with reinforcing outer ribs 40 and confronting marginal surrounding flanges 36a and 38a, respectively.

The hydraulic load cell H is shown as comprising a hydraulic pressure chamber 42 formed between a first circular member 44 and a second circular member 46, with the aid of a flexible diaphragm 48. This diaphragm, as best shown in FIG. 5, is clamped about its periphery, by means of a clamping ring 52 and retaining screws 54, to a peripheral flange 44a of the first circular member 44, thereby forming the pressure chamber. The second circular member 46 is upwardly cupped and engages the major portion of the outer surface of the diaphragm so that, when a force is applied to move the members 44 and 46 towards each other, a hydraulic pressure will be developed in the chamber 42. The periphery of the member 46 is formed with a peripheral surrounding flange 46a which is in spaced relation to the clamping ring 52.

The force applying element 38 is in nested relation with respect to a third circular member 56 having a surrounding peripheral flange portion 58 positioned in confronting overlying close proximity to the flange 38a of the force applying element 38. Centrally, the force applying member 38 and the third circular member 56 are formed with nested interfitting recessed portions 60 and 62, the latter forming a receiving chamber 64 for the electronic load cell E, with the aid of a removably mounted closure plate 66 which is removably retained by peripheral retaining screws 68. The receiving chamber 64 has an open upper end which is closed by a force transmitting cover plate 70 having a radially projecting peripheral margin 72 in overlapping relation with the adjacent surface of the third member surrounding said chamber. The peripheral margin 72 has a circumferential edge shoulder 74 in confronting relation with a surrounding shoulder 76 on the third member, these shoulders coacting to guidingly center the cover plate with respect to said chamber, while permitting axial movement of the members 56 and 70 towards and away from each other.

The cover plate 70 on its underside projects into the receiving chamber 64 and normally engages a load plunger 78 which extends upwardly from the load cell E so as to normally support the cover plate 70 in a position in which the undersurface of the marginal portion 72 will be spaced substantially 0.010 inch from the adjacent underlying surface of the third circular member 56. The upper surface of the margin 72 is in abutting relation with the adjacent overlying undersurface of the flange 46a of the second circular member. The electronic load cell E and the hydraulic load cell H are thus mechanically coupled in series relation for activation by load forces tending to move the first circular member 44 and the third circular member 56 towards each other. It should be noted that in the normal position of the cover plate 70 this plate supports the second circular member 46 in a position in which the undersurface of the flange 46a will be positioned in spaced relation to the adjacent upper surface of the flange 58 a distance of substantially 0.020 inch.

In order that the tension forces, which tend to move the force applying elements 36 and 38 away from each other, shall be transformed to compression forces for the actuation of the load cells, the force applying element 36 is rigidly connected to the third circular member 56, and the force applying element 38 is rigidly connected to the first circular member 44. More specifically, the force applying element 36 is rigidly connected with the member 56 by means of a plurality of tie bolts 80, and the force applying element 38 is rigidly connected with the member 44 by means of tie bolts 82. The bolts 80 and 82 are arranged alternately in a circular series and equidistantly spaced from one another as best shown in FIG. 4. The bolts 80 pass through appropriate openings in the flange 36a and have their head portions seated on an underlying washer 84, and the bolts 82 pass through flange 38a and have their head portions seated on an underlying washer 86. The other ends of the bolts 80 and 82 are in threaded engagement with flanges 58 and 44a, respectively.

The spacer sleeve 88 surrounds each of the tie bolts 80, one end of this sleeve bearing against the undersurface of flange 36a, and the other end bearing against the upper surface of flange 58. A spacer sleeve 90 surrounds each of the bolts 82, one end bearing against the washer 86 and the other end bearing against the undersurface of flange 44a.

The flange 44a and connected clamping ring 52 are provided with appropriate aligned openings for the reception of the bolts 80 therethrough, and in each case the openings are provided with a bushing 92 having sliding engagement with the spacer sleeve 88. In a similar manner, the flange 46a is provided with suitable openings in each case containing a bushing 94. The bolts 82 extend through appropriate openings in the flanges 58, 46a and clamping ring 52, which are respectively provided with bushings 96, 98 and 100 having surrounding engagement with the spacer sleeve 90 in each case.

The outputs of the hydraulic load cell H and the electronic load cell E are connected with appropriate indicators as diagrammatically indicated at 102 and 104 in FIG. 1. In the case of the hydraulic load cell H, the member 44 is provided with a port 106 through which the chamber 42 may be filled and to which is connected, by means of a fitting 108, one end of a flexible conduit 110 housed in the force applying element 36. The other end of the conduit 110 is connected with a fitting 112 which is removably connected to the outside of the force applying element 36 and provides for connection with a line, such as the conduit 114 leading to the indicator 102 which may be in the form of a pressure gauge calibrated to indicate load forces. In the case of the electronic load cell E, the output circuitry is carried through a conduit 116 to the indicator 104, an appropriate switch 118 being provided to enable connection and disconnection of the indicator with respect to the electronic load cell output. The indicator in this case may comprise an electrically energizable meter calibrated in load indicating indicia.

In operation of the load sensing device in apparatus which tends to move the force applying elements 36 and 38 away from each other, their separating movements will move the members 44 and 56 towards each other, the resulting movement acting through the load plunger 78 of the electronic load cell, the cover plate 70 and the member 46 to increase the hydraulic pressure in chamber 42. Thus, both the hydraulic load cell H and electronic load cell E will be activated and tend to show on their respective indicators the amount of the applied load force. When the hydraulic load cell only is utilized, the indicator 104 may be disconnected by opening the switch 118.

In the event that it is desired, for some reason, to utilize the output indications of the electronic load cell E, rather than that of the hydraulic load cell H, the switch 118 would be placed in its closed position and the compression forces acting on the hydraulic load cell H will be by-passed by means which will now be described.

Referring to FIG. 3, it will be seen that the flange 46a of the member 46 and the clamping ring 52 on the member 44 are normally in spaced apart relation and that during operation of the hydraulic load cell this space tends to diminish as the applied load forces are increased. Provision is therefore made for fixedly interconnecting the member 46 and the ring 52 in a manner to prevent diminution of this space. This is accomplished by providing a split ring structure as shown in FIG. 6 and generally indicated by the numeral 120. The ring is comprised of two sections 122a and 122b, these sections being connected at one set of their adjacent ends by conventional hinge means 124 permitting swinging movements of the sections to opened and closed positions. The other set of adjacent ends of the ring sections is provided with releasable latching means which is shown as comprising a pin 126 adapted to be removably inserted through registering openings of a plurality of lugs 128 carried by section 122a and a lug 130 carried by the section 122b. In the closed position of the ring, the lugs will be in overlapping relation. As thus arranged, the ring 120 in its opened position may be inserted in the space between the flange 46a and clamping ring 52, as indicated in phantom lines in FIG. 3 to rigidly oppose operation of the hydraulic load cell H, when desired.

From the foregoing description and drawings, it will be clearly evident that the delineated objects and features of the invention will be accomplished.

Various modifications may suggest themselves to those skilled in the art without departing from the spirit of our invention, and hence, we do not wish to be restricted to the specific forms shown or uses mentioned except to the extent indicated in the appended claims.

We claim:

1. A load sensing device for load indicating means having a pair of spaced members supported for separating movement under applied tension load forces, comprising:
    (a) a pair of force applying elements respectively connectable with said spaced members;
    (b) a pair of load cells, one of the hydraulic type and the other of the electronic type, mechanically interconnected in series operative relationship between said force applying elements and being operatively responsive to compression load forces;
    (c) the hydraulic load cell comprising first and second opposed members interconnected by a diaphragm for relative movement and coacting to form a variable pressure hydraulic chamber adapted to contain a liquid, said first of the opposed members being positioned adjacent one of the force applying elements;
    (d) a third member spaced from said second member and being positioned adjacent the other of said force applying elements;
    (e) the electronic load cell having a load plunger and being positioned with one end connected with said third member;
    (f) a force transmitting member interposed between said plunger and said second member;
    (g) means interconnecting said force applying elements respectively with said first and third members so that upon movement of said force applying elements away from each other under tension load forces, said first and third members will be moved towards each other to apply concomitant compression load forces to said hydraulic load cell and said electronic load cell;
    (h) said interconnecting means comprising tie members connecting said one force applying member with said third member and said other force applying member with said first member, and said second member having sliding guided relation with respect to said tie members.

2. A load sensing device according to claim 1, wherein the tie members connecting said one force applying member with said third member comprise one series of circumferentially spaced tie members, and the tie members connecting said other force applying member and said first member comprise another series of circumferentially spaced tie members in alternating relation to the tie members of said one series.

3. A load sensing device according to claim 1, in which said force transmitting member has abutting engagement with said second member and is spaced from said third member.

4. A load sensing device according to claim 3, including load indicating means responsive to variations in fluid pressure in response to relative movements of said first and second members; and other load indicating means responsive to relative movements between said force transmitting member and said third member.

5. A load sensing device according to claim 4, including means for selectively inactivating one of said load indicating means during use of the other load indicating means.

6. A load sensing device according to claim 1, in which said other force applying element and said third member have central interfitting recessed portions; the recessed portion of the third member providing a receiving chamber for said electronic cell with its load plunger uppermost; said force transmitting member comprising a cover plate having a peripheral margin in overlapping relation with the adjacent surface of the third member surrounding said chamber; and including surrounding confronting shoulders on said cover plate and said third member coacting to center the cover plate with respect to said chamber.

7. A load sensing device for load indicating means having a pair of spaced members supported for separating movement under applied tension load forces, comprising:
 (a) a pair of force applying elements respectively connectable with said spaced members;
 (b) a pair of load cells, one of the hydraulic type and the other of the electronic type, mechanically interconnected in series operative relationship between said force applying elements and being operatively responsive to compression load forces;
 (c) the hydraulic load cell comprising first and second opposed members interconnected for relative movement and coacting to form a variable pressure hydraulic chamber adapted to contain a liquid, said first of the opposed members being positioned adjacent one of the force applying elements;
 (d) a third member spaced from said second member and being positioned adjacent the other of said force applying elements;
 (e) the electronic load cell being positioned with one end connected with said third member and its other end connected with said second member;
 (f) means interconnecting said force applying elements respectively with said first and third members so that upon movement of said force applying elements away from each other under tension load-forces, said first and third members will be moved towards each other to apply concomitant compression load forces to said hydraulic load cell and said electronic load cell;
 (g) said third member and the other of said force applying elements being provided with interfitting upwardly opening recessed portions; and
 (h) a cover member coacting with the recessed portion of the third member to provide a chamber for receiving the electronic load cell therein with one end in engagement with the cover, and said cover being in engagement with said second member.

8. A load sensing device according to claim 7, in which said third member and the other of said force applying elements are connected for guided axial relative movements.

9. A load sensing device according to claim 7, in which said cover and said third member have overlying axially facing peripheral portions in spaced relation permitting limited movement towards each other during the application of compressive forces to the electronic load cell in said chamber.

* * * * *